United States Patent [19]

Flavell

[11] Patent Number: 4,534,703
[45] Date of Patent: Aug. 13, 1985

[54] WIND POWER SYSTEM

[76] Inventor: George A. Flavell, 3425 E. 50th St., Minneapolis, Minn. 55417

[21] Appl. No.: 527,686

[22] Filed: Aug. 30, 1983

[51] Int. Cl.³ .............................................. F03D 3/06
[52] U.S. Cl. .................................. 416/119; 416/132 B
[58] Field of Search .................. 416/135 A, 118-119, 416/132 B

[56] References Cited

U.S. PATENT DOCUMENTS

| 44,018 | 8/1864 | Santee | 416/119 |
|---|---|---|---|
| 450,411 | 4/1891 | Irrgang | 416/118 |
| 685,774 | 11/1901 | Lieske | 416/135 A X |
| 1,076,713 | 10/1913 | Southwick | 416/111 UX |
| 1,201,184 | 10/1916 | Holben | 416/DIG. 6 X |
| 1,249,206 | 12/1917 | Rubottom | 416/111 |
| 1,306,311 | 6/1919 | Pendergast | 416/119 X |
| 1,403,234 | 1/1922 | Crowley | 416/118 |
| 1,447,853 | 3/1923 | Iochum | 416/119 |
| 1,535,585 | 4/1925 | Dyer | 416/119 X |
| 1,917,655 | 7/1933 | Leash | 416/DIG. 6 X |
| 2,006,024 | 6/1935 | Lockwood | 416/118 X |
| 4,052,134 | 10/1977 | Rumsey | 416/119 |
| 4,090,811 | 5/1978 | Greene | 416/119 |

FOREIGN PATENT DOCUMENTS

| 424 | 2/1895 | Denmark | 416/119 |
|---|---|---|---|
| 30006 | 7/1922 | Denmark | 416/119 |
| 91760 | 9/1961 | Denmark | 416/119 |
| 32051 | 6/1885 | Fed. Rep. of Germany | 416/119 |
| 116657 | 1/1901 | Fed. Rep. of Germany | 416/119 |
| 371331 | 3/1907 | France | 416/119 |
| 2300910 | 9/1976 | France | 416/DIG. 6 |
| 309276 | 7/1933 | Italy | 416/119 |
| 40572 | 7/1914 | Sweden | 416/119 |
| 96045 | 9/1922 | Switzerland | 415/3 R |

Primary Examiner—Everette A. Powell, Jr.
Attorney, Agent, or Firm—Peterson, Wicks, Nemer & Kamrath

[57] ABSTRACT

A wind power system according to the preferred embodiment of the present invention is shown as including a vertically orientated main shaft. The wind power system further includes, in its preferred form, first and second horizontally orientated main frames, with the first frame including a plurality of vanes defining a first set of vanes and an equal number of vanes defining a second set of vanes located diametrically opposite each other about the main shaft. Similarly, the second horizontally orientated main frame includes a third set and a fourth set of vanes. Preferably, the vanes are flat and rectangular in shape and are pivotal about one of their vertical edges by a shaft pivotally mounted to the main frame between a first, wind catching position and a second, wind releasing position. The vanes of the vane sets are maintained in the same relative position to each other. The first and second set of vanes and the third and fourth set of vanes are pivotally related to each other such that when one set of vanes is in the first position, the other set of vanes is in their second position. In the most preferred form of the present invention, wheel assemblies are further provided attached to the main frames for rolling support on a generally horizontally disposed support surface for reducing the cantilever forces placed upon the main shaft.

6 Claims, 3 Drawing Figures

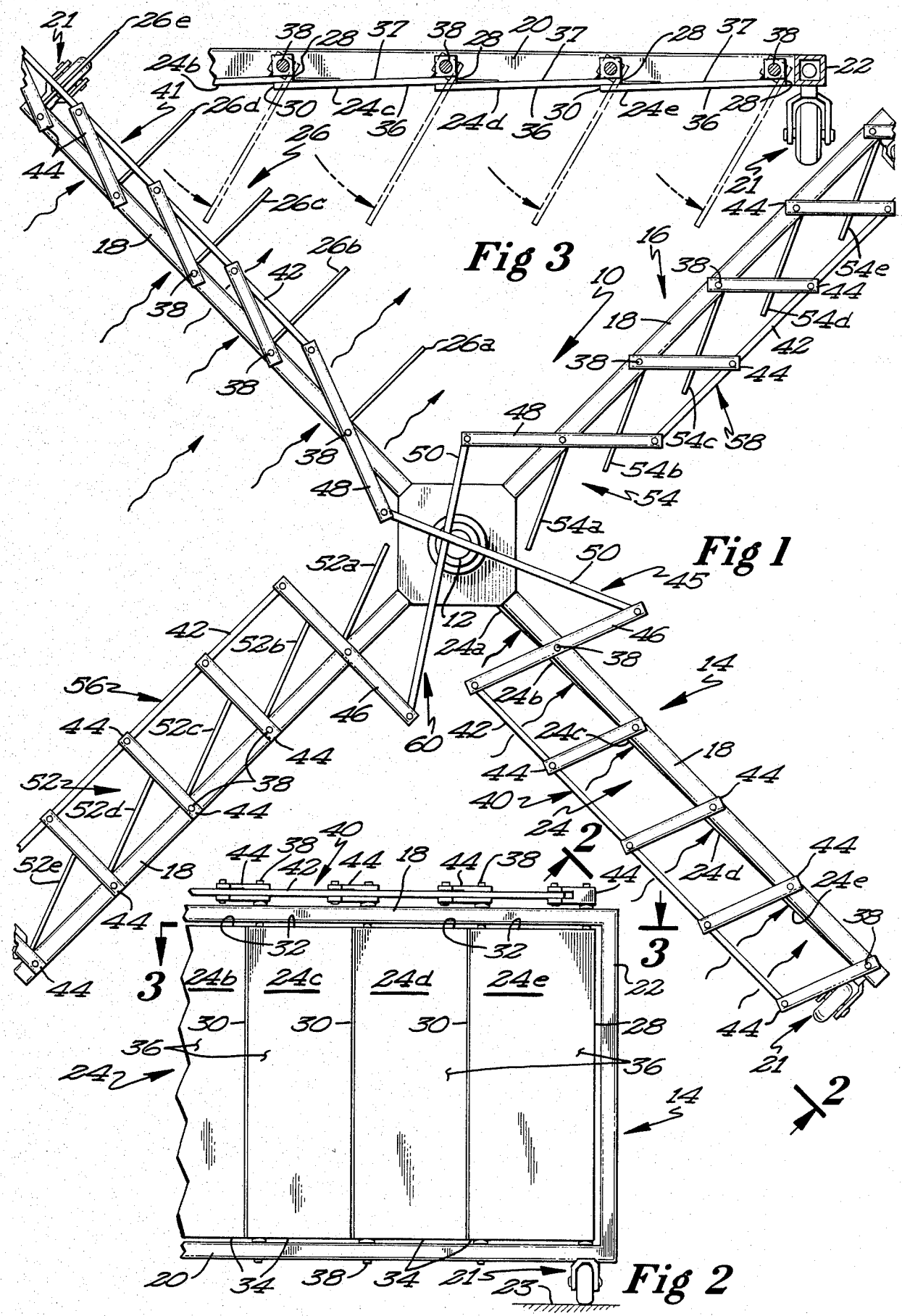

WIND POWER SYSTEM

BACKGROUND

The present invention relates generally to wind power systems and more specifically to wind power systems having a vertically orientated main shaft.

With the depletion of and increasing cost of fossil based fuels, a need has arisen for renewable, economical, energy sources which are not in any way harmful to the environment. One such type of renewable energy source is energy converted by wind power. Further, within the class of wind derived energy sources, wind power systems having vertically orientated main shafts are preferred to wind power systems having horizontally orientated main shafts.

Therefore, a need has arisen for wind power systems having a vertically orientated main shaft which are of simple design, which are self starting, which are self governing, which are unidirectional, which may include further support to reduce the cantilever forces placed on the main shaft, and which maximize power output.

SUMMARY

The present invention solves these and other needs in wind power systems having a vertically orientated main shaft by providing, in the preferred embodiment, a horizontally orientated main frame operatively attached to the main shaft. First and second sets of vanes are further provided pivotally attached to the main frame on diametrically opposite sides of the main shaft. The vanes are pivotal from a first, wind catching position generally parallel to the main frame to a second, wind releasing position generally perpendicular to the main frame. The first set of vanes are pivotally related with the second set of vanes such that when the first set of vanes is in its first position, the second set of vanes is in its second position, and when the first set of vanes is in its second position, the second set of vanes is in its first position. Thus, the wind will act on the set of vanes in its first position to rotate the main shaft but will pass through or be released through the set of vanes in its second position so as not to impede the rotation of the main shaft by the other set of vanes.

Thus, it is an object of the present invention to provide a novel wind power system.

It is also an object of the present invention to provide such a novel wind power system having a vertically orientated main shaft.

It is also an object of the present invention to provide such a novel wind power system which is self governing so that other mechanisms for regulation of speed are not necessary.

It is also an object of the present invention to provide such a novel wind power system which is self starting.

It is also an object of the present invention to provide such a novel wind power system which maximizes the energy output.

It is also an object of the present invention to provide such a novel wind power system where the cantilever forces placed upon a vertically orientated main shaft may be reduced.

It is also an object of the present invention to provide such a novel wind power system which is of simple design.

It is also an object of the present invention to provide such a novel wind power system which is unidirectional.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a top plan view of a wind power system constructed according to the teachings of the present invention.

FIG. 2 shows a side view of the system of FIG. 1 taken along view line 2—2 of FIG. 1.

FIG. 3 shows a cross sectional view of the system of FIG. 1 taken along section line 3—3 of FIG. 2.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

In the figures, a wind power system constructed according to the teachings of the present invention is shown and generally designated 10. System 10 generally includes a vertically oriented main shaft 12 including in its most preferred form first and second vane frames 14 and 16. Vane frames 14 and 16 are horizontally oriented and thus are generally perpendicular to shaft 12 and are dynamically balanced about shaft 12. Frames 14 and 16 generally include top and bottom frame portions 18 and 20 which are horizontally disposed in a parallel, spaced relation in a vertical plane. An end frame portion 22 is further provided extending between the free ends of portions 18 and 20. In its most preferred form, the free ends of frame portion 20 include wheel assemblies 21 for providing rolling support of frame portion 20 on a generally horizontally disposed support surface 23. It can then be appreciated that wheel assemblies can reduce the cantilever forces placed upon shaft 12 by vane frames 14 and 16 and the other components supported thereby.

First vane frame 14 includes first and second sets of vanes 24 and 26 dynamically balanced on opposite sides of shaft 12. Vanes 24 and 26 generally include a first vertical edge 28, a second vertical edge 30, a top edge 32, a bottom edge 34, a first wind abutment surface 36 and a second wind abutment surface 37. In its most preferred form, vanes 24 and 26 are flat and have a rectangular shape. Vanes 24 and 26 further include a shaft 38 defining a vertical pivot axis attached in its most preferred form to the first vertical edge 28. Shafts 38 extend between and are rotatably mounted in top and bottom portions 18 and 20 of frame 14.

First set of vanes 24 includes, in the preferred embodiment, a plurality of vanes and specifically is shown in the drawings as including five vanes 24a, 24b, 24c, 24d, and 24e. Vanes 24a–24e are pivotable about shafts 38 between a first, wind catching position which is generally in the same plane as frame 14 and a second, wind releasing position which is generally perpendicular to frame 14. In its most preferred form, the second edge 30 of vane 24 abuts with first edge 28 and shaft 38 of the next radially adjacent vane 24 to prevent pivoting therebeyond. Thus, second edge 30 of vane 24e abuts with edge 28 and shaft 38 of vane 24d, and second edge 30 of vane 24d abuts with edge 28 and shaft 38 of vane 24c, and so on. Edge 30 of vane 24a abuts with shaft 12. It can then be appreciated that this construction arrives at several advantages. For example, this abutment arrangement prevents vanes 24 from pivoting beyond their first, wind catching position, the location of maximum wind catching area. Further, the stress placed on vanes 24 especially adjacent edge 30 is greatly reduced by this abutment relation. Furthermore, vanes 24a, 24b, 24c, 24d, and 24e abut with each other and create a sealing effect between the vanes to prevent air passage between the vanes which would reduce efficiency. Thus, vanes 24a–e abutting with each other in effect creates a single vane of their combined area.

Due to pivotal mounting of vanes 24 about shaft 38, wind blowing against surface 36 will tend to pivot vanes 24 about shafts 38 from their second, wind releasing position to their first, wind catching position whereas wind blowing against surface 37 will tend to pivot vanes 24 about shafts 38 from their first, wind catching position to their second, wind releasing position.

First set of vanes 24 further includes member 40 for maintaining vanes 24a–24e in the same pivotal position relative to each other. Member 40 in its most preferred form includes an adjustable parallelogram structure including an elongated, orientation control, linkage member 42 and horizontally orientated, vane orientation pivot arms 44 having a first end connected to vertically orientated shafts 38 of vanes 24a–24e and having a second end pivotally connected to elongaged member 42. Arms 44 of vanes 24a–24e are parallel to each other and thus maintain vanes 24a–24e in the same relative position.

Second set of vanes 26 includes a plurality of vanes, particularly, includes the same number of vanes as first set of vanes 24, and specifically is shown in the drawings as including five vanes 26a, 26b, 26c, 26d, and 26e of identical construction as vanes 24. Vanes 26 are pivotally mounted on the opposite side of frame 14 than vanes 26 such that vanes 26 extend in the opposite direction from frame 14 in their second, wind releasing position than the direction vanes 24 extend from frame 14 in their second wind releasing position. Further, vanes 26 include member 41 for maintaining vanes 26a–26e in the same pivotal position shown in most preferred form as being of the same construction as member 40.

First vane frame 14 further includes member 45 for pivotally relating vane sets 24 and 26. Member 45 includes in its most preferred form a first horizontally orientated, vane set orientation pivot arm 46 having a first end attached to vertical shaft 38 of vane 24a, a second horizontally orientated, vane set orientation pivot arm 48 having a first end attached to shaft 38 of vane 26a, and a vane set orientation linkage arm 50 extending between and being pivotally attached to the free ends of arms 46 and 48. In the most preferred form, arms 46 and 48 are formed by the continuation of arms 44 extending beyond shaft 38. Vanes 24 and 26 are pivotally related such that when vanes 24 are in their first position, vanes 26 are in their second position and when vanes 24 are in their second position, vanes 26 are in their first position.

In the preferred embodiment, the length of arm 50 is determined by extending arms 46 and 48 parallel to each other but in opposite directions, with arm 50 extending between and being generally perpendicular to arms 46 and 48. At this position, vanes 24 and 26 are located generally midway between their first and second positions. Thus, arms 46 and 48 extend at an approximate angle of 135 degrees from surfaces 37 of vanes 24a and 26a, respectively, and arms 44 extend at an approximate angle of 45 degrees from surface 36 of vanes 24 and 26.

Second vane frame 16 in the preferred embodiment of the present invention is of identical construction as first vane frame 14 and includes third and fourth sets of vanes 52 and 54. Third set of vanes 52 includes vanes 52a, 52b, 52c, 52d, and 52e maintained in the same pivotal position by member 56. Likewise, fourth set of vanes 54 includes vanes 54a, 54b, 54c, 54d, and 54e maintained in the same pivotal position by member 58. In its most preferred form, members 56 and 58 are of identical construction as members 40 and 41. Second vane frame 16 further includes a member 60 for pivotally relating vanes 52 and 54 which in its most preferred form is of an identical construction as member 45.

Now that the structure of system 10 of the preferred embodiment of the present invention has been set forth, the operation and subtle features of the present invention can be set forth and appreciated. When vanes 24, 26, 52, and 54 are in their second, wind releasing position, the wind will generally not act thereon but will generally pass therethrough. Thus, the wind will not in any way cause rotation of frames 14 and 16 about shaft 12 in a direction opposite to the direction when the wind acts upon vanes 24, 26, 52, and 54 in their first, wind catching position. Therefore, efficiency of the system 10 is maximized for increasing energy output.

Furthermore, the location of shafts 38 along first edge 28 of vanes 24, 26, 52, and 54, rather than in a position spaced between first and second edges 28 and 30, also maximizes efficiency. Specifically, if the pivot axis of the vanes were located between the edges of the vanes, the wind acting on the portions of the vane on opposite sides of the pivot axis would tend to pivot the vane in opposite directions around the vane pivot axis. Utilizing the present invention, all the wind acting upon the first wind abutment surface 36 of vanes 24, 26, 52, and 54 will tend to cause the vane to move to its first, wind catching position and thus also maximizes efficiency.

Assuming for sake of example that vanes 24 are in their first, wind catching position and that frame 14 is located generally perpendicular to the wind direction, it should initially be noted that vanes 26 are held in their second, wind releasing position due to the pivotal position member 45. Furthermore, the wind acting upon the second wind abutment surface 37 of vanes 26 rotate vanes 26 about shaft 38 from their first wind catching position to their second, wind releasing position. The wind acting upon vanes 24 in their first, wind catching position places a torquing force upon shaft 12 causing rotation thereof as well as rotation of frames 14 and 16 attached thereto. As frames 14 and 16 rotate, it can then be appreciated that the wind decreases its angle direction from generally perpendicular to the wind abutment surface 36 of vanes 24 to a lesser angle.

As frames 14 and 16 rotate, it can then be appreciated that the wind begins to act upon the first wind abutment surfaces 36 of vanes 52 and the second wind abutment surfaces 37 of vanes 54. Thus, vanes 52 move from their second, wind releasing position to their first, wind catching position and vanes 54 move from their first, wind catching position to their second, wind releasing position due to wind acting on surfaces 36 and 37 and due to member 60. Thus, the wind then acts upon vanes 52 in their first, wind catching position placing a torquing force upon shaft 12 and causing its rotation as well as the rotation of frames 14 and 16 attached thereto. Likewise, as frames 14 and 16 continue to rotate, the wind will begin to act less on vanes 52 but will begin to act on the first abutment surface 36 of vanes 26 and the second abutment surface 37 of vanes 24 causing vanes 26 to pivot from their second, wind releasing position to their first, wind catching position and vanes 24 to pivot from their first, wind catching position to their second wind releasing position. This process then continues as long as the wind blows.

Although the positions of vanes 24, 26, 52, and 54 are dependent on the wind and the pivotal position of shaft 12, first and second sets of vanes 24 and 26 are mechanically independent from the third and fourth sets of vanes 52 and 54. This results in several advantages. First, the complexity of the vane pivotal structure is greatly reduced. Next, system 10 is generally self starting whatever the initial stationary pivotal location of frames 14 and 16 or whatever the wind direction. For example, even assuming that frame 14 is initially stationary at a location generally perpendicular to the wind direction with vanes 24 located in their second, wind releasing position and vanes 26 located in their first, wind catching position, the wind acting upon surface 36 of vanes 24 and surface 37 of vanes 26 will cause vanes 24 to move to their first, wind catching position and vanes 26 to move to their second, wind releasing position and cause rotation of vane frame 14. At that time, the wind can act on vanes 24 beginning rotation of shaft 12.

Furthermore, it should be noted that system 10 is unidirectional and will not operate in a backwards direction. Specifically, due to the manner in which vanes 24, 26, 52, and 54 are pivotally mounted about edges 28 by shafts 38 to vane frames 14 and 16 and the location of shafts 38 for vanes 24 and 52 being on opposite sides of frames 14 and 16 than vanes 26 and 54, respectively, the wind acting upon wind abutment surface 37 will cause vanes 24, 26, 52, and 54 to move from their first, wind catching position to their second, wind releasing position and wind acting upon wind abutment surface 36 will cause vanes 24, 26, 52, and 54 to move from their second, wind releasing position to their first, wind releasing position. Furthermore, this movement is enhanced as a result of members 45 and 60. The wind can then act upon the vanes in their first, wind catching position and begin rotating system 10.

Vanes 24, 26, 52, and 54 in their first, wind catching position generally prevent the passage of wind therethrough and therefore shield the set of vanes in the next rotation direction. Specifically, this shielding effect prevents excessive force being placed upon the set of vanes in the next rotation direction from being acted upon by the wind for moving beyond the second, wind releasing position.

Furthermore, system 10 is believed to be generally self governing even in very high wind speeds and thus does not require other mechanisms for regulating speed. Specifically, as the speed of rotation of vane frames 14 and 16 increases, centrifugal force is place upon vanes 24, 26, 52, and 54 to move from their first, wind catching position to their second, wind releasing position. Additional weight can also be added to arms 44 at their outer ends for increasing the centrifugal force. As the momentum of system 10 increases approximating the wind speed, the force of the wind acting upon wind abutment surfaces 36 and 37 decreases to a point where it does not overcome this centrifugal force. Therefore, vanes 24, 26, 52, and 54 will not completely pivot to the first, wind catching position. Therefore, the angle of the wind direction with respect to wind abutment surface 36 is less than 90 degrees and a lesser amount of force is placed upon the vanes and the wind will simply blow through and between the vanes of the vane sets 24, 26, 52, and 54. Therefore, the torque force of the wind on the vane frames will be reduced and the speed of rotation will not increase above this maximum, centrifugally limited rotation speed.

In addition to the above advantages, other advantages of system 10 result from the fact that shaft 12 is located in a vertically orientated position. For example, since frames 14 and 16 are horizontal, wheel assemblies 21 can be provided to reduce the cantilever forces placed upon shaft 12 by gravity. Therefore, vane frames 14 and 16 as well as vanes 24, 26, 52, and 54 can be made of a much larger size. This results in several advantages including a larger wind action surface and increased leverage created by the longer length of frames 14 and 16 allowing greater torque transfer and allowing operation of system 10 in lower wind speed environments. Additionally, the longer length of frames 14 and 16 allows rotation of shaft 12 at lower revolutions per minute speed while having the same frame tip speed.

Likewise, due to the vertical orientation of shaft 12, system 10 can be positioned in locations where wind power systems having horizontally orientated shafts can not be located for safety or economical reasons. For example, system 10 can be located on the roofs of buildings where support 23 is supported upon or forms the roof of the building. Furthermore, the vertical orientation of shaft 12 provides a safety consideration over horizontally orientated shaft type wind power systems.

Now that the basic teachings of the present invention have been explained, many extensions and variations will be obvious to one having ordinary skill in the art. For example, although an even number of vane sets is required, the number of vane frames can be varied. Specifically, if the self starting feature in any wind direction of system 10 of the preferred embodiment of the present invention is not desired, system 10 can be constructed with a single vane frame. Likewise, the number of vane frames can be increased beyond the two vane frames 14 and 16 shown, especially for larger diameter vane frames.

Additionally, although five vanes are shown in each set of vanes 24, 26, 52, and 54, the number of vanes can be varied in system 10 or between the vane frames provided in system 10.

Likewise, although vanes 24, 26, 52, and 54 are shown in the preferred embodiment as being flat and rectangular in shape, other types, shapes, and forms of vanes can be utilized according to the teachings of the present invention.

Suitable bumpers or other abutment members can be provided on edges 28 and 30 of vanes 24, 26, 52, and 54 for preventing wear, reducing noise, and for other reasons between abutting vanes in their first, wind catching positions.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Wind power system comprising, in combination: a vertically orientated main shaft; a horizontally orientated main frame operatively attached to the main shaft; a first set of vanes, with the first set of vanes including at least a first vane; a second set of vanes, with the second set of vanes including the same number of vanes as the first set of vanes; with the vanes including at least a first wind abutment surface and means for pivotally mounting the vanes to the horizontally orientated main frame about a vertical axis generally parallel to but spaced from the main shaft, with the vanes being pivotal between a first, wind catching position and a second, wind releasing position, with the first set of vanes being located on diametrically opposite sides of the main shaft than the second set of vanes; and means for pivotally relating the first set of vanes with the second set of vanes for smoothly alternating between a first condition and a second condition as the wind power system is being rotated about the vertically oriented main shaft by the wind, with the first condition having the first set of vanes in its first position and the second set of vanes in its second position and thus allowing the wind to blow against the first wind abutment surface of the first set of vanes causing rotation of the vertically orientated main shaft and allowing the wind to pass through the second set of vanes to substantially not impede the rotation caused by the first set of vanes, and with the second condition having the first set of vanes in its second position and the second set of vanes in its first position and thus allowing the wind to blow against the second wind abutment surface of the second set of vanes causing rotation of the vertically orientated main shaft and allowing the wind to pass through the first set of vanes to substantially not impede the rotation caused by the second set of vanes, wherein the pivotally relating means comprises, in combination: a first vane set orientation pivot arm having a first end operatively attached to the first vane of the first set of vanes generally perpendicular to the vane vertical axis and having a second end; a second vane set orientation pivot arm having a first end operatively attached to the first vane of the second set of vanes generally perpendicular to the vane axis and having a second end; and a linkage arm extending between and pivotally attached about vertical axes to the second ends of the first and second vane set orientation pivot arms; a second horizontally orientated main frame operatively attached to the main shaft; a third set of vanes, with the third set of vanes including at least a first vane; a fourth set of vanes, with the fourth set of vanes including the same number of vanes as the third set of vanes; with the third set of vanes being located on the second horizontally orientated main frame on diametrically opposite sides of the main shaft than the fourth set of vanes; and means for pivotally relating the third set of vanes with the fourth set of vanes for smoothly alternating between a first condition and a second condition as the wind power system is being rotated about the vertically oriented main shaft by the wind, with the first condition having the third set of vanes in its first position and the fourth set of vanes in its second position and thus allowing the wind to blow against the first wind abutment surface of the third set of vanes causing rotation of the vertically oriented main shaft and allowing the wind to pass through the fourth set of vanes to substantially not impede the rotation caused by the third set of vanes, and with the second condition having the third set of vanes in its second position and the fourth set of vanes in its first position and thus allowing the wind to blow against the first wind abutment surface of the fourth set of vanes causing rotation of the vertically orientated main shaft and allowing the wind to pass through the third set of vanes to substantially not impede the rotation caused by the fourth set of vanes, with the pivotal position of the third and fourth sets of vanes being mechanically independent of the pivotal position of the first and second set of vanes, wherein the pivotally relating means comprises, in combination: a third vane set orientation pivot arm having a first end operatively attached to the first vane of the third set of vanes generally perpendicular to the vane vertical axis and having a second end; a fourth vane set orientation pivot arm having a first end operatively attached to the first vane of the fourth set of vanes generally perpendicular to the vane axis and having a second end; and a linkage arm extending between and pivotally attached about vertical axes to the second ends of the third and fourth vane set orientation pivot arms; wherein each set of vanes includes a plurality of vanes, and wherein the pivoting relating means further comprises, in combination: means for maintaining the plurality of vanes of each set of vanes in the same pivotal position relative to each other; and means for maintaining the plurality of vanes of each set of vanes in the same pivotal position relative to each other; wherein the means for maintaining the plurality of vanes in the same pivotal position comprises, in combination: vane orientation pivot arms having a first end operatively attached to the vane generally perpendicular to the vane vertical axis and having a second end; and an elongated member, with the second ends of the vane orientation pivot arms of each of the vanes in the set of vanes being pivotally attached to the elongated member such that the vane orientation pivot arms of each of the vanes are parallel to each other; and wherein the vane set orientation pivot arms are formed by the continuation of the vane orientation pivot arms extending beyond the vane pivot axis; wherein the vane set orientation pivot arms are formed by the continuation of the vane orientation pivot arms extending beyond the vane pivot axis; and wherein the pivotal position of the third and fourth sets of vanes are mechanically independent of the pivotal position of the first and second set of vanes.

2. The wind power system of claim 1 further comprising, in combination: means for providing support for the horizontally orientated main frame for reducing the cantilever forces placed upon the main shaft by the horizontally orientated main frame.

3. The wind power system of claim 2 further comprising a generally horizontally disposed support surface through which the vertically orientated main shaft extends; and wherein the support means comprises, in combination: wheel assemblies attached to the horizontally orientated main frame for rolling support of the main frame member on the horizontally disposed support surface.

4. The wind power system of claim 1 wherein the vanes further include a first vertical edge, a second vertical edge, a top edge, a bottom edge, and a second wind abutment surface, with the vane vertical axis being generally adjacent and parallel to the first vertical edge and wherein when the wind acts on the first wind abutment surface it pivots the vane about its vane pivot axis to its first, wind catching position and wherein when the wind acts on the second wind abutment surface it pivots the vane about its vane pivot axis to its second, wind releasing position.

5. The wind power system of claim 4 wherein the vanes are flat and are rectangular in shape.

6. The wind power system of claim 1 wherein in the first, wind catching position, the vanes are generally parallel to the main frame, and wherein in the second, wind releasing position, the vanes are generally perpendicular to the main frame.

* * * * *